3,817,759
Patented June 18, 1974

3,817,759
COATING FOR PREVENTING THE FOULING OF SHIPS' PARTS BY MARITIME ORGANISMS
Johann Wessely, Munich, Germany, assignor to Dow Corning Corporation, Midland, Mich.
No Drawing. Filed June 30, 1971, Ser. No. 158,523
Int. Cl. C09d 5/16
U.S. Cl. 106—15 AF
9 Claims

ABSTRACT OF THE DISCLOSURE

This invention relates to a coating composition suitable for preventing the fouling of ships' parts by maritime organisms. The composition consists of polymeric titanium acid esters of aliphatic alcohols, $MoS_2$, solvents and graphite.

---

The fouling of ships' parts by maritime organisms has always been a difficult problem. It results in considerable interference with normal operation, firstly because the changes in the surface occasioned by the fouling of ships' parts by maritime organisms results in increased frictional resistance, and secondly the movement of certain mechanisms, e.g. ships' valves, is adversely affected to a large extent by the deposits created by such fouling. For years, therefore, constant attempts have been made to find effective coating materials for preventing these deposits and, therefore, the fouling. Thus, for example, copper, mercury and arsenic compounds as such have been applied to the portions of the ship's hull exposed to the sea water. Although these substances are effective initially, they are in time removed by the sea water. These and other toxic substances have also been mixed into coating compositions and the preparations have, after application, resulted in varnish-like coats which were not satisfactory or successful. Apparently, it is necessary for the toxic substance to react with the sea water in order to exert its effect on the maritime organisms. A good paint prevents this reaction and one which is not durable disappears in time from the surface and can, therefore, no longer be effective.

In general, the portions of a ship which are immersed in the sea water are given one or more undercoats which combat the danger of corrosion. In recent times, these undercoats have contained titanium dioxide and oxides of antimony instead of lead and zinc compounds as the pigment for protection against corrosion. On top of these anti-rust coats, there is then applied a top coat for combating the adherence of maritime organisms, viz., the so-called "antifouling" coating which may, for example, contain copper, mercury or arsenic compounds, less frequently also organic poisons, such as 2,4-dichloro-1,4-naphthoquinone, DDT and the like. The copper compounds recommended are mainly cuprous oxide, cupric hydroxide and copper naphthenate. Coatings containing tributylzincoxide are also known.

The object of the invention is, therefore, the creation of an effective coating material for preventing the fouling of ships' parts by maritime organisms, which does not have the disadvantages of the coating materials hitherto known for the purpose. The requirements which such coating materials have to satisfy are very numerous and have in part not yet been recognized. Firstly, the coating has to be paint-like and resistant to attack by water in order to ensure its durability. Secondly, it must be porous to such an extent that the sea water may gain access to the substance which provides the toxic effect. This toxic substance has to be soluble in water to a very small extent, in order to exert an effect on the organisms, but its solubility must not be so great that premature leaching and exhaustion takes place. Such a porous, paint-like layer must have a low coefficient of friction so that for purely physical reasons different maritime animals are less likely to be sucked against the surface (such attack constitutes the first phase of the fouling) since the porous paint-like layer does not permit any build-up of a vacuum and does not permit any resistance to the flow forces of the adjacent water.

The coating composition according to this invention contains binders which are polymeric titanic acid esters of aliphatic alcohols having 1 to 5 carbon atoms, particularly polymeric butyltitanate having a molecular weight of 1000 to 2000 (Trade Name n-butyltitanate-polymer by Titangesellschaft mbH, Leverkusen, Germany). These titanic acid esters are viscous liquids which will cure when exposed to the influence of the humidity of the air. The amount of binder is 5 to 15, preferably 9 percent by weight based on the overall composition of the coating. Ten to 20, preferably 16, percent by weight of molybdenum disulphide in pulverized form is present as a means for achieving a low coefficient of friction. The molybdenum disulphide may partially be replaced by a graphite of the kind suitable for lubricating purposes, but only up to an amount not exceeding 8 percent by weight, based on the overall composition. One to 5, preferably 3, percent by weight of antimony oxides preferably antimony trioxide is present as the means for providing a toxic effect. Additionally, the coating composition, according to the invention, contains a solvent mixture, consisting preferably of halogenated hydrocarbons and fatty acid esters, particularly 1,1,1-trichloroethane or trichloroethylene and butylacetate, the mixture having a ratio of 58:10 parts by weight and being present in a quantity of 60 to 75, preferably 68, percent by weight, based on the overall preparation.

The coating composition according to the invention can also be applied in the form of a spray. In this case, the preparation contains 15 to 25, preferably 18, percent by weight of the above-described basic preparation according to the invention, and 85 to 75, preferably 82, percent by weight of a propellant, for example, one of the mixtures of chlorinated and fluorinated hydrocarbons known by the Trade Names Frigen®, Freon® or Kaltron®, or carbon dioxide.

The application takes place in a known manner. The coating composition is applied to the surfaces of the undercoat which have previously been cleaned and degreased in a conventional manner, by dipping, brushing or spraying.

In a preferred form of application, molybdenum disulphide in pulverized form and having a particle size not exceeding 10 microns may additionally be applied to the coating after the coating composition has been allowed to cure. The molybdenum disulphide is then polished by means of a suitable appliance, e.g. a soft felt disc.

The surprising technical advance achieved by the coating composition according to the invention is apparent from the following example which further explains but does not limit the invention.

EXAMPLE 1

The preparation in accordance with the invention consists of 9 percent by weight of polymeric n-butyltitanate (n-butyltitanate polymer), 16 percent by weight of molybdenum sulphide in pulverized form, and having a particle size not exceeding 50 microns, 4 percent by weight of graphite (German type designation UF 2), 3 percent by weight of antimony trioxide, 58 percent by weight of 1,1,1-trichloroethane and 10 percent by weight of butylacetate. This basic preparation was filled into aerosol canisters in the ratio of 18 percent by weight to 82 percent by weight of a 50/50 propellant mixture of monofluorotrichloromethane and difluorodichloromethane (Trade Mark Frigen® 11/12 5050). A layer of the spray was applied to the grill of dimensions 60 x 65 cm. of the cooling water inlet valve of a large tanker. After half an hour, molybdenum disulphide powder having a particle size not exceeding 10 microns was polished onto this layer by means of a soft felt disc. The grill of the other inlet valve was left untreated. The ship was in service for one year mainly in tropical waters, in which fouling by maritime organisms is particularly prevalent. Thereafter, it was taken into dry dock for examination. Whilst the part of the ship which had been treated with the coating composition, according to the invention, was entirely free from maritime organisms, the part which had been treated with conventional coating materials, was, as expected, very heavily fouled by maritime organisms.

EXAMPLE 2

When a material similar to the material of Example 1, but which contained no graphite, was tested as indicated above, nearly equivalent results were obtained.

That which is claimed is:

1. A coating composition for preventing the fouling of ships' parts by maritime organisms, containing 5 to 15 percent by weight of a polymeric titanium acid ester of an aliphatic alcohol having 1 to 5 carbon atoms, 10 to 20 percent by weight of molybdenum disulphide in pulverized form, 1 to 5 percent by weight of an antimony oxide and 60 to 75 percent by weight of a solvent mixture and, if desired, a propellant, the ratio of propellant by weight to the totality of the remaining constituents being between 85:15 and 75:25, particularly 82:18.

2. A coating composition according to claim 1, characterized in that it contains the titanium acid ester in the form of polymeric butyltitanate having a molecular weight of 1000 to 2000.

3. A coating composition according to claim 1, characterized in that it contains 16 percent by weight of molybdenum disulphide.

4. A coating composition according to claim 1, characterized in that it contains the antimony oxide in the form of antimony trioxide.

5. A coating composition according to claim 1, characterized in that it contains the solvent mixture in the form of a mixture of a halogenated hydrocarbon and a fatty acid ester.

6. A coating composition according to claim 5, characterized in that it contains the halogenated hydrocarbon in the form of 1,1,1-trichloroethane or trichloroethylene.

7. A coating composition according to claim 5, characterized in that it contains the fatty acid ester in the form of butylacetate.

8. A coating composition according to claim 5, characterized in that the solvent mixture consists of 58 percent by weight of the halogenated hydrocarbon and 10 percent by weight of the fatty acid ester.

9. A coating composition according to claim 5, characterized in that it contains 1 to 8 percent by weight of graphite in pulverized form.

References Cited

UNITED STATES PATENTS

| | | | |
|---|---|---|---|
| 3,530,569 | 9/1970 | Wilson | 106—14 X |
| 8,275 | 8/1851 | Wetterstedt | 106—15 AF |
| 2,580,025 | 10/1951 | Holmes | 106—15 AF |
| 3,211,563 | 10/1965 | Reed | 106—15 AF |
| 2,941,903 | 6/1960 | Winston | 260—2 T X |
| 2,621,193 | 12/1952 | Langkammerer | 260—414 |
| 2,768,909 | 10/1956 | Haslam | 117—121 |
| 2,870,044 | 1/1959 | Blatz | 260—2 T X |
| 2,941,895 | 6/1960 | Haslam | 106—193 |
| 3,169,095 | 2/1965 | Thiel et al. | 252—305 X |
| 3,513,104 | 5/1970 | Healy | 252—305 |

MELVYN I. MARQUIS, Primary Examiner

U.S. Cl. X.R.

106—15 FP, 193 R; 117—124 T, 132 C; 252—305; 260—2 T, 18 K